United States Patent
Krieger et al.

(10) Patent No.: US 6,763,703 B2
(45) Date of Patent: Jul. 20, 2004

(54) METHOD AND DEVICE FOR DETERMINING LEAKS AT THE SEAL OF A VALVE

(75) Inventors: Juergen Krieger, Bueckeburg (DE); Thomas Georg Karte, Lemgo (DE); Andreas Elting, Hannover (DE)

(73) Assignee: ABB Patent GmbH, Mannheim (DE)

( * ) Notice: Subject to any disclaimer, the term of this patent is extended or adjusted under 35 U.S.C. 154(b) by 0 days.

(21) Appl. No.: 10/021,951

(22) Filed: Dec. 13, 2001

(65) Prior Publication Data

US 2003/0041651 A1 Mar. 6, 2003

(30) Foreign Application Priority Data

Dec. 20, 2000 (EP) .............................. 00127903

(51) Int. Cl.[7] .............................. G01M 3/04; G01M 3/08
(52) U.S. Cl. .................. 73/49.8; 73/46; 73/47
(58) Field of Search .................. 73/46, 49.8, 47, 73/48; 702/51

(56) References Cited

U.S. PATENT DOCUMENTS

| | | | | |
|---|---|---|---|---|
| 3,827,285 | A | * 8/1974 | Grove | 73/46 |
| 4,043,355 | A | * 8/1977 | Cerruti et al. | 73/40.5 R |
| 4,573,344 | A | * 3/1986 | Ezekoye | 73/46 |
| 4,916,938 | A | * 4/1990 | Aikin et al. | 73/46 |
| 5,244,183 | A | * 9/1993 | Calvin et al. | 73/46 |
| 5,345,812 | A | * 9/1994 | Haboian | 73/46 |
| 5,372,352 | A | * 12/1994 | Smith et al. | 73/46 |
| RE34,923 | E | * 5/1995 | Ruesch | 73/46 |
| 5,607,165 | A | * 3/1997 | Bredemeyer | 277/320 |
| 5,811,663 | A | * 9/1998 | Kim | 73/49.7 |
| 5,927,685 | A | * 7/1999 | Gosling | 73/46 |

FOREIGN PATENT DOCUMENTS

JP  403279834 A  * 12/1991  ............ 73/47

* cited by examiner

*Primary Examiner*—Michael Cygan
(74) *Attorney, Agent, or Firm*—Michael M. Rickin

(57) ABSTRACT

There is described herein a method and a device for determining leaks at the seal of a valve or a valve rod, in particular of a process valve so that an indication that the valve-rod seal needs changing can then be obtained in good time. In order to determine the leak, the pressure is determined, if appropriate as a function of time, in a control volume between a first valve-rod seal and a second valve-rod seal, and the leak flow rate is calculated therefrom.

15 Claims, 7 Drawing Sheets

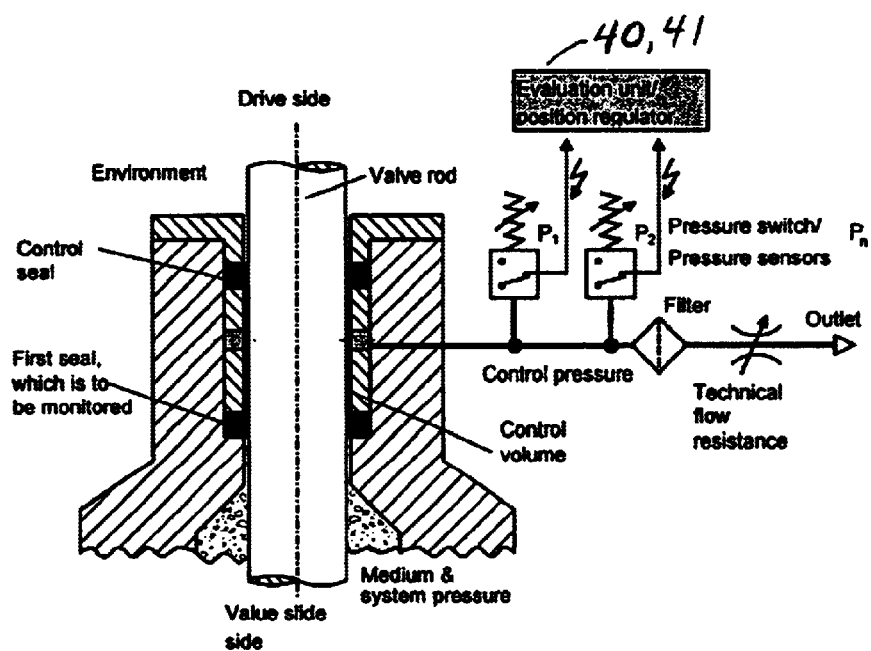
Figure 2: Continuous monitoring of a seal by observing the control pressure, in this case, by way of example, by means of two pressure switches

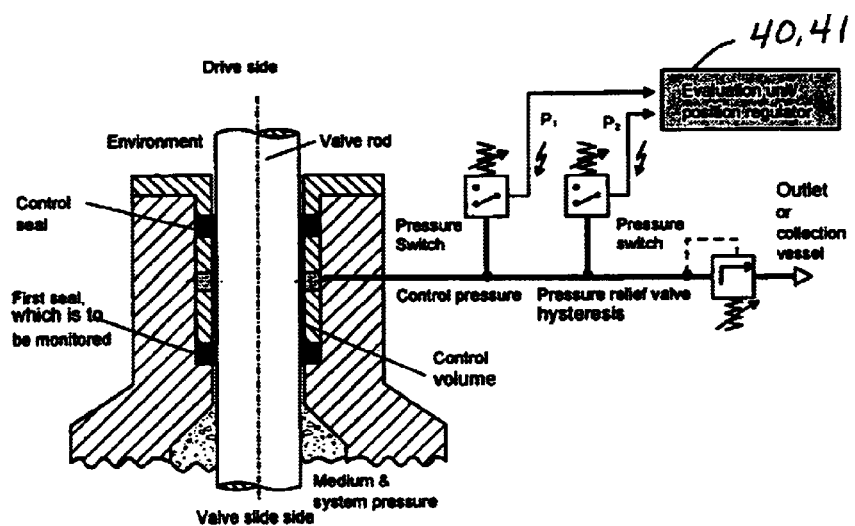
Figure 3: Monitoring of a seal by observing the control pressure, venting from time to time via a pressure relief valve with hysteresis

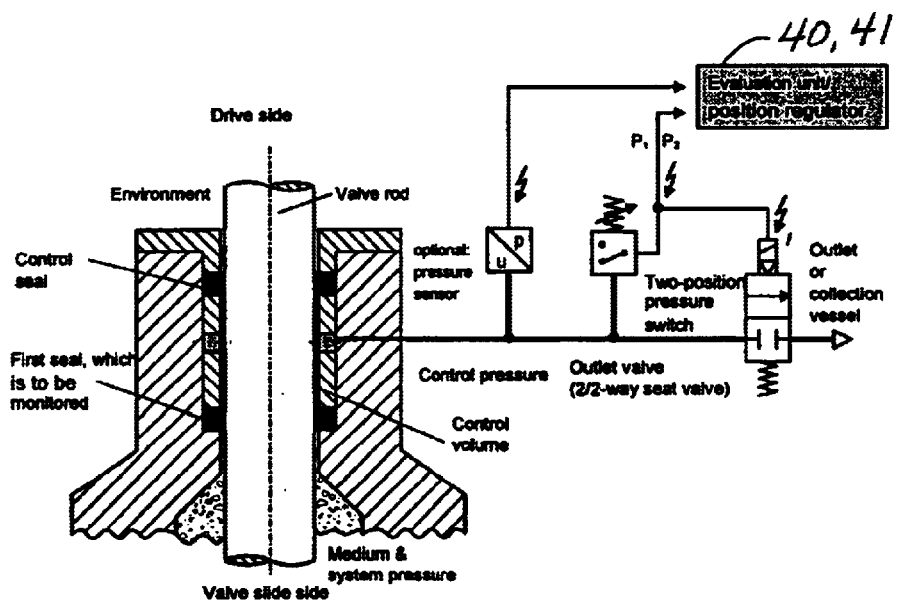
Figure 4: Monitoring of a seal by observing the control pressure, venting from time to time via a 2/2-way switching valve of the "normally closed" type, driving for example by means of two-position pressure switch

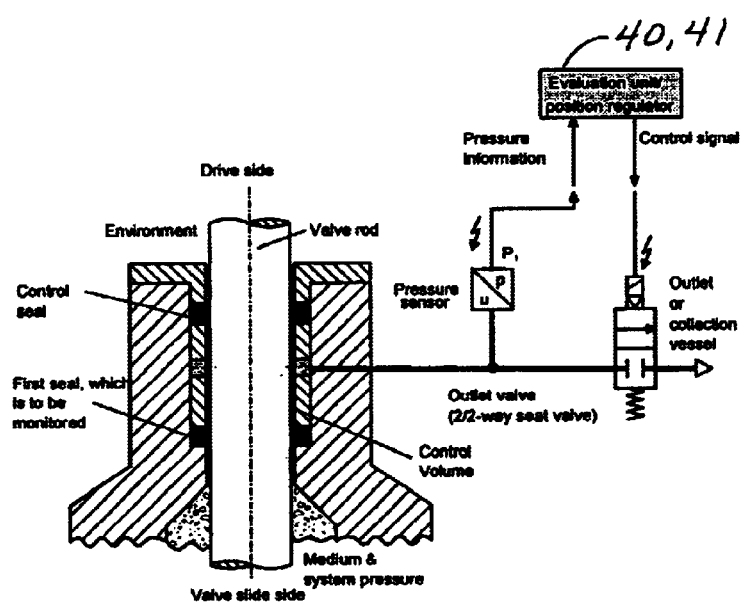
Figure 5: Monitoring of a seal by observing the control pressure, venting from time to time via a 2/2-way switching valve of the "normally closed" type, driving via evaluation unit

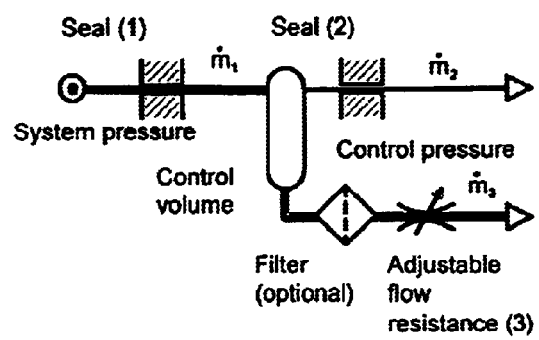
Figure 6: Equivalent circuit diagram for a control system with two seals and a flow resistance

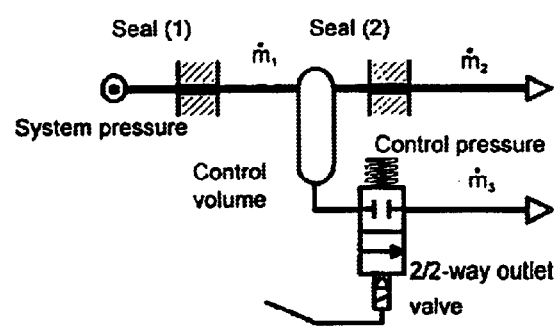
Figure 7: Equivalent circuit diagram for a control system with two seals and a 2/2-way outlet valve

METHOD AND DEVICE FOR DETERMINING LEAKS AT THE SEAL OF A VALVE

FIELD OF THE INVENTION

This invention relates to a method and a device for determining leaks of the seal of a valve or of a valve rod and in particular to the determining of such leaks in a process valve.

DESCRIPTION OF THE PRIOR ART

In accordance with the prior art, the leadthroughs of valve rods, which connect the drive to the valve slide, on engineering valves, i.e. on process valves, are sealed using packing made from a very wide range of materials and designs or using lip seals.

While the valve is being used, wear and/or damage to the packing and seals may occur, leading to leaks. A leak leads to the medium which is controlled by the process valve being able to pass into the environment. This undesirable effect is known as an external leak or a leak to the environment.

Depending on the physical and chemical properties of the medium, on the nature of the application and on the location of use, a continuous leak may be permissible within certain limits. For other applications, leaks of any type must be avoided wherever possible. Particularly when using flammable and explosive media and toxic substances or substances which are difficult to degrade, leaks may entail devastating consequences for the environment or may put people and equipment in danger. Also, when using valuable substances, the financial losses caused by leaks must not be underestimated.

The invention is therefore based on the object of developing a method and a device that can reliably and safely recognize a leak in the region of the valve rods of process valves so that an indication that the valve-rod seal needs to be changed can then be obtained in good time.

SUMMARY OF THE INVENTION

With regard to the method, the core idea of the invention is that, to determine the leak, the pressure is determined, if appropriate as a function of time, in a control volume between a first valve-rod seal and a second valve-rod seal, and this pressure is used to calculate the leak flow rate. Compared to a known design of valve, there is now, as it were, a further seal connected downstream of the valve-rod seal. However, this further seal is not acting as a redundant seal as part of a sealing assembly, but rather is used to create a defined control volume between the conventional seal and the second seal, and this volume is monitored in the illustrated manner.

Although a simple redundant design produced by a seal assembly comprising a plurality of seals, as is often used in the prior art, does provide a relatively good sealing action for a limited time, the leak per se cannot be detected. By contrast, the method according to the invention provides a very reliable way of determining the leak and therefore determining the state of the seal.

In an advantageous configuration, the value for the leak flow rate is used to draw conclusions as to whether the seal is sealed, and in this way a seal replacement time is determined.

Furthermore, it is advantageous for the control volume to be discontinuously opened or emptied and then closed again, and for the pressure rise in the control volume then to be measured. In this way, it is possible to reproduce a fixed starting point, from which measurements can always be carried out.

In a further configuration, the pressure of the control volume is limited, and the control volume is emptied when an upper pressure level is reached, until a low closing pressure has been established.

The control volume may in this case be vented or emptied via a switching valve which is actuated by pressure switch means, and a leak flow rate can then be determined as a function of the closing time, the pressure in the control volume and the state equations of the working medium.

Alternatively, the procedure can be such that an upper pressure level and a low closing pressure are recorded by pressure switches or by a pressure sensor, and then a leak flow rate is determined as a function of the closing time, the pressure in the control volume and the state equations of the working medium.

Furthermore, it is advantageous to drive the switching valve using a control programme in such a way that when a test cycle is initiated, the individual steps of the test cycle take place automatically. The test cycle then advantageously includes the following steps:

opening the switching valve and venting the control volume, closing the control volume and starting the control time, determining a pressure rise by recording the control volume pressure over time, evaluating and generating a message or an alarm in the event of predetermined pressure rise values being exceeded.

It is advantageous to vent the control volume via a flow resistance, in which case a particle filter is connected upstream and the differential pressure between intermediate volume pressure and pressure downstream of the flow resistance is measured, and the degree of soiling of the filter is additionally determined therefrom.

With regard to the device, the core idea of the invention consists in the fact that a control volume is designed between a first valve-rod seal and a second valve-rod seal, and that at least one pressure sensor and/or pressure switch is used to monitor the pressure of this control volume, and this control volume is logic-connected to an evaluation unit or a position regulator in order to determine a leak flow rate. With regard to the device, in this connection it is, of course, highly advantageous to use a flow resistance and filter to vent or empty the control volume.

To determine the degree of soiling of the filter, a further pressure sensor is arranged downstream of the filter, and to determine the degree of soiling the differential pressure between the pressure in the control volume and the pressure downstream of the filter is measured, it being possible, if appropriate, to generate a command and/or a signal to change the filter.

Advantageously, it is now possible to vent or empty the control volume via a switching valve which can be actuated by means of a pressure switch. It is also advantageous for the switching valve to be designed as a pressure-relief valve.

Furthermore, it is now possible for the switching valve to be driven by means of an evaluation unit or a position regulator.

The switching valve may be designed as a directional control valve, in particular as a 2/2 directional control valve.

If pollutants are present in the working pressure medium, the control volume (30) can be vented into a closed or closeable volume.

When suitable leak flow rate limit values are reached, it is, in an advantageous configuration, possible for a command and/or a signal to change the valve-rod seal to be generated automatically. On account of the fact that the state of the seal is in fact determined using remote monitoring, a device of this type can be used particularly advantageously as a process valve which can be monitored remotely.

DESCRIPTION OF THE DRAWING

FIG. 2 shows method of operation A—monitoring with continuous opening of the control volume.

FIG. 3 shows monitoring by observation of the control pressure.

FIG. 4 shows the same as FIG. 3, with venting from time to time.

FIG. 5 shows the same as FIG. 4, with a "normally closed" type of valve.

FIG. 6 shows an equivalent circuit diagram with seals and flow resistance.

FIG. 7 shows an equivalent circuit diagram with seals and a 2/2-way outlet valve.

DESCRIPTION OF THE PREFERRED EMBODIMENT(S)

Figure 1:
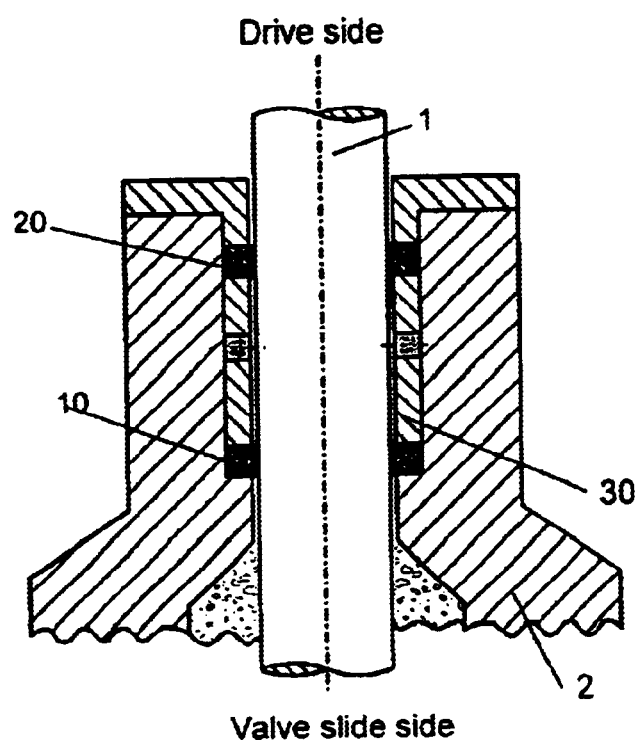
FIG. 1 shows a valve rod with seal and control seal.

FIG. 1 illustrates the basic idea which is implemented in both methods or device configurations. To monitor leaks or to detect leaks on seals and packing which are used to seal the housing leadthrough 2 of the valve rod 1 on engineering valves, in addition to the first seal 10 a second seal 20 of identical or different form, known as the "control seal" is used. This second seal 20 is also used to seal the valve rod 1 and is arranged in series with the first seal 10, on its side which is remote from the system pressure.

The two seals 10 and 20 enclose a volume, which is known as the control volume 30. Depending on the design of the process valve, this control volume is constant or can vary within set limits. It is assumed that the seal 10 which is to be monitored wears as quickly as or more quickly than the control seal 20. In the event of a leak occurring at the seal 10 which is to be monitored or at both seals 10,20, the pressure rises in the control volume 30. The use of pressure sensors or pressure switches allows the pressure rise to be recorded and interpreted by means of an intelligence unit (e.g. position regulator with corresponding control program).

Depending on the permissible leak rate, a distinction is drawn between two modes of operation, the first of which is shown in FIG. 2. If a certain leak rate—even if only a small leak rate—is permitted, the control volume 30 can be emptied continuously. For continuous emptying, the control volume is opened to the environment or into a collection vessel via a technical flow resistance which has to be calibrated once (e.g. a restrictor, gap or diaphragm). A filter may, as is shown in FIG. 2, be provided upstream of the resistance, in order to prevent it from becoming blocked by particles or other solids entrained in the medium.

The worn seals also represent a resistance in terms of flow. The pressure drop across the seals which are to be monitored leads to a leak flow, which is to be detected. The leak flow into the control volume 30 in turn leads to a pressure rise in this volume. The pressure rise leads to leak flows also being established both across the second seal and across the technical flow resistance. By correct matching or setting of the technical flow resistance, it is possible for by far the majority of the flow to be guided over this technical resistance. Depending on its flow characteristics and the properties of the medium used, a pressure which is greater than the ambient pressure and lower than the system pressure is established in the control volume 30. The occurrence of this very pressure is detected by means of sensors P1 and P2 and is a necessary index of a leak flow rate which has been selected in advance by adjustment of the technical flow resistance.

By matching a pressure level and the technical flow resistance, it is possible to establish a leak rate which lies between the "good state" and the unacceptable "defective state". Furthermore, by using two or more pressure switches $P_n$ or one pressure sensor, it is possible to differentiate between different strengths of leak.

A filter may be provided upstream of the outlet restrictor, in order to prevent contamination, for example from the medium or as a result of abrasion, which could lead to the technical flow resistance becoming blocked. If appropriate, the state of the filter can also be monitored by means of a differential pressure switch.

FIG. 3 shows a different mode of operation, specifically that which involves monitoring with the control volume 30 being opened from time to time or at intervals, i.e. discontinuously. If permanent leak rates are not acceptable, the control volume 30 is, if necessary, emptied only under orders of the operating staff, via, as is shown in FIG. 3, a pressure-relief valve PV1.

Following the emptying, in the event of a leak via the seal which is to be controlled, a pressure rise takes place in the control volume, which can be used to identify the leak flow rate. It is possible to draw a distinction between the following variants in terms of selection of components and the procedure.

Variant 1a

The control volume 30 is provided with a pressure-relief valve PV1 with sufficient, known hysteresis. When the adjusted opening pressure is reached, the control volume 30 is emptied until the lower closing pressure has been established.

The switching points are recorded using two pressure switches or a pressure sensor and are transmitted to a position regulator 41.

An evaluation unit 40, which interprets the signals from the pressure switches or the pressure sensor, may, as is shown in FIG. 3, be integrated in the position regulator 41. A leak flow rate is determined as a function of the closing time, the control volume, the pressure in the control volume and the state equations of the working medium.

The leak flow rate determined is compared with a permissible leak flow rate. If the permissible leak flow rate is exceeded, an alarm is generated by the evaluation unit 40 and is transmitted to a higher-level monitoring unit (e.g. a control system which is not shown in FIG. 3). The alarm which occurs may also be indicated directly on the outside of the position regulator 41.

Variant 1b

For this variant which is shown in FIG. 4, a 2/2-way switching valve V1 of the "normally closed" type with an outlet to the environment or into a collection vessel is provided on the control volume. The switching valve V1 is to be designed as a seat valve providing a sufficient seal.

The switching valve V1 can be actuated in three different ways:

1. By means of a pressure switch with sufficient and known hysteresis or a two-position switch as is shown in FIG. 4.
2. By means of two pressure switches, which are each set to a known opening and closing pressure.
3. By means of a pressure switch with downstream timer (switch-off delay).

As shown in FIG. 4, it is additionally possible to use a pressure sensor which transmits the pressure signal to the position regulator 41.

In the position regulator 41 there is an evaluation unit 40 which interprets the signals from the pressure switch and/or the pressure sensor. A leak flow rate is determined as a function of the closing time, the control volume, the pressure in the control volume and the state equations of the working medium. The leak flow rate determined is compared with an admissible leak flow rate. If an admissible leak flow rate is exceeded, the evaluation unit 40 generates an alarm and transmits it to a higher-level monitoring unit (e.g. a control system which is not shown in FIG. 4). The alarm which is generated can also be displayed directly on the outside of the position regulator 41.

Variant 2

This variant is similar to Variant 1b, except that the switching valve is actuated by a position regulator with a corresponding control programme. A test cycle is initiated
- regularly (for example every day, every week, every month, etc.)
- on demand from a higher-level control system,
- or on a one-off basis, for example as a result of another event.

The test cycle proceeds as follows:
1.) Opening of the 2/2-way switching valve and venting/emptying of the control volume (collecting the medium if appropriate).
2.) Closing the control volume and starting the control time.
3.a) Seal to be monitored is functioning: there is no pressure rise.
3.b) Seal to be monitored is leaking: there is a pressure rise.
4.) In the event of a pressure rise, the time until a defined pressure level is reached is determined (e.g. using a pressure switch (not shown) or limit-value monitoring in the position regulator), or the pressure rise rate is measured (e.g. using a pressure sensor).

It is possible to determine a measure of the leak rate across the seal which is to be monitored, as a function of the properties of the medium, from the time which elapses between the control volume being closed and a control pressure being reached, and from the level of the control pressure. The same variable can also be determined from the pressure rise rate.

When a predetermined leak rate occurs, it is possible both to generate a fault message and to interrupt or stop the test cycle until the outstanding maintenance or repair has taken place. To this extent, the possibility of further leaks is prevented.

The event which triggers a test cycle may, if appropriate, also be the first pressure rise in the control volume itself. A recurring pressure rise in the control volume up to a selected pressure level is also a conceivable reason for initiating a new test cycle, which in the event of a leak occurring leads to permanent repetition of the test cycle.

If the test cycle becomes shorter than an admissible time interval, it is once again possible to generate a fault message and to definitively interrupt the test cycle, as can be seen from FIG. 5.

Alternatively, the pressure level can also be monitored using, for example, a two-position pressure switch with downstream logic.

Principles Involved in Calculating the Leak on the Basis of the Pressure Rise in the Control Volume Continuous Measurement Working on the basis that the static seals used are ideally sealed, the control volume represents an open system with three links to its environment. The three links are
1. the seal (1) which is to be monitored, between the medium to be sealed and the control volume,
2. the additional seal (2), between the control volume and the environment, and
3. the known flow resistance (3) between the control volume and the environment.

For this purpose, FIG. 6 shows an equivalent circuit diagram with two seals and a flow resistance. The system pressure $p_s$ is higher than the pressure $p_k$ in the control volume, and the latter is for its part higher than ambient pressure $p_u$:

$$p_s > p_k > p_u \qquad 0.1.$$

The mass flow rate resulting from the leak across the seal 1 which is to be monitored is split into in each case a mass flow rate across the seal 2 and a mass flow rate across the flow resistance. The flow resistance at the seal 2 is assumed to be approximately equal to or, more likely, greater than that of seal 1. The set control pressure in the control volume is less than 10% of the system pressure. Therefore, even in the event of seal 1 and seal 2 having identical resistances, there is a lower mass flow rate across seal 2 than across seal 1. Since the continuity equation applies, if the system pressure is constant a constant control pressure is also established. This state is to be considered as a steady state.

$$\dot{m}_1 = \dot{m}_2 + \dot{m}_3 \qquad 0.2.$$

The remaining mass flow rate across the known flow resistance can be calculated as follows:

$$\dot{m}_3 = \dot{m}_1 - \dot{m}_2 \qquad 0.3$$

If $$p_k \ll p_s \text{ and therefore } \dot{m}_2 \ll \dot{m}_1 \qquad 0.4$$

then $$\dot{m}_3 \approx \dot{m}_1 \qquad 0.5.$$

As far as possible, the control pressure is to be selected in such a way that $$\dot{m}_2 \leq 10\% \cdot \dot{m}_1 \qquad 0.6$$

and therefore $$\dot{m}_3 \geq 90\% \cdot \dot{m}_1 \qquad 0.7.$$

In this case, using the reverse conclusion, the leak mass flow rate can be worked out from the control pressure. Depending on the medium and the flow law of the flow resistance, the following equation applies:

$$\dot{m}_1 = \frac{\dot{m}_3(p_k, T_k, \text{flow resistance } C, b, \text{etc.})}{0.9}. \qquad 0.8$$

For a defined maximum permissible leak rate $\dot{m}_{1,zul}$, an alarm is generated if $$\dot{m}_1 \geq \dot{m}_{1,zul} \qquad 0.9.$$

Gaseous Media

By way of example, the leak rate for the gas air is described below as an example representing a wide range of possible gaseous media:

For a flow resistance (3) in diaphragm form, having the critical pressure ratio b of the resistance and the guide value C (corresponds to the flow coefficient), if $$b \le \frac{p_u}{p_k} \le 1,$$

the flow through the flow resistance is sub-critical:

$$\dot{m} = C_{resistance} \cdot p_k \cdot \rho_0 \cdot \sqrt{\frac{T_0}{T_k}} \cdot \sqrt{\left(1 - \left(\frac{\frac{p_u}{p_k} - b}{1-b}\right)^2\right)} \quad 0.10$$

and if $$0 \le \frac{p_u}{p_k} < b,$$

flow through the flow resistance is super-critical $$\dot{m} = C_{resistance} \cdot p_k \cdot \rho_0 \cdot \sqrt{\frac{T_0}{T_k}}. \quad 0.11$$

The guide value C can be determined by measurements or can be calculated using the geometry of the narrowest cross section $A_2$ and the expected constriction $\alpha_D$:

$$C = \frac{\alpha_D A_2 \psi_{max} \sqrt{2 R_{L,0} T_0}}{p_0}. \quad 0.12$$

If, for example, the system pressure is 10 $bar_{rel}$ and the selected control pressure is 1 $bar_{rel}$, the guide value, for a restrictor bore of d=0.1 mm with a constriction $\alpha_D$=0.6 and $\psi_{max}$=0.484, is:

$$C = \frac{\alpha_D A_2 \psi_{max} \sqrt{2 R_{L,0} T_0}}{p_0} = 0.05612 \, \frac{NL}{min \cdot bar}. \quad 0.13$$

On account of the pressure relationship $$0 \le \frac{p_u}{p_k} = \frac{1 \, bar}{2 \, bar} = 0.5 < b = 0.528 \quad 0.14$$

the flow is super-critical, so that the air mass flow rate is $$\dot{m}_3 = C_{resistance} \cdot p_k \cdot \rho_0 \cdot \sqrt{\frac{T_0}{T_k}} = 0.0022074 \, \frac{g}{s} \quad 0.15$$

and the standard volumetric flow rate is $$\dot{V}_3 = 112.24 \, \frac{Ncm^3}{min}. \quad 0.16$$

Accordingly, the leakage would be $$\dot{V}_1 = \frac{\dot{V}_3}{0.9} = 124.71 \, \frac{Ncm^3}{min}. \quad 0.17$$

Compressible Liquids

In the case of liquids, it is necessary to distinguish which form of flow occurs at the respective seals (1+2) and the flow resistance (3). It is essentially necessary to differentiate between two types of resistances, the diaphragm and the gap. For a resistance in diaphragm form, i.e. with sharp edges, the following relationship applies:

$$Q = \alpha_D \cdot A \cdot \sqrt{\frac{2}{\rho}} \cdot \sqrt{\Delta p}. \quad 0.18$$

Accordingly, for a resistance in gap form with a circular cross section: the following relationship applies:

$$Q = \frac{\pi \cdot r^4}{8 \cdot \eta \cdot l} \cdot \Delta p \quad 0.19$$

and with a rectangular cross section the relationship is:

$$Q = \frac{b \cdot h^3}{12 \cdot \eta \cdot l} \cdot \Delta p. \quad 0.20$$

The pressure difference $\Delta p$ results in this case from $$\Delta p = p_k - p_u \quad 0.21.$$

Cross sections in diaphragm form are preferred in this case, since the associated flow behavior is not dependent on temperature.

The leak mass flow rate across the seal to be monitored can be calculated, for example, using the density $\rho$ of the medium for a resistance (3) in diaphragm form as:

$$\dot{m}_1 = \frac{\dot{m}_3}{0.9} = \frac{\alpha_D \cdot A \cdot \sqrt{\frac{2}{\rho}} \cdot \sqrt{p_k - p_u}}{0.9}. \quad 0.22$$

Discontinuous Measurement

Working on the assumption that the static seals used are ideally sealed, the control volume for discontinuous measurement likewise represents an open system with three links to its environment. The three links are 1. the seal (1) which is to be monitored, between the medium to be sealed and the control volume,
2. the additional seal (2), between the control volume and the environment, and
3. the 2/2-way outlet valve which is opened from time to time.

FIG. 7 shows an equivalent circuit diagram for a control system with two seals and a 2/2-way outlet valve.

To determine the leak rate, two states of the fluid in the control volume which follow one another in time are considered, for which states $$p_k(t_2) > p_k(t_1) \quad 0.23$$

and $$t_2 > t_1 \Rightarrow dt = t_2 - t_1 \quad 0.24.$$

Working on the basis that the volume and the properties of the fluid are known and that the second seal wears less quickly or at the same rate as the first seal, it is possible to determine the leak flow rate. For this purpose, the difference between the two masses at times $t_1$ and $t_2$ is formed and is, based on the time interval dt:

$$\dot{m}_1 - \dot{m}_2 = \frac{\Delta m_k}{dt} = \frac{m_k(t_2) - m_k(t_1)}{t_2 - t_1}. \quad (0.25)$$

Assuming that $$p_k \ll p_s \text{ and therefore } \dot{m}_2 \ll \dot{m}_1 \quad (0.26)$$

the leak mass flow rate across the seal to be monitored is $$\dot{m}_1 = \frac{\Delta m_k}{dt} = \frac{m_k(t_2) - m_k(t_1)}{t_2 - t_1}. \quad (0.27)$$

Gaseous Media

In the text which follows, the leak rate for the gas air is described by way of example, once again representing a wide range of possible gaseous media:

According to the gas equation for real gases, for an enclosed air mass m in a volume V at a temperature T and the pressure p air and the gas constant R, the following relationship applies:

$$p \cdot V = m \cdot R \cdot T \cdot Z \quad (0.28)$$

In the case of an ideal gas, which air at a defined pressure and temperature range can be considered to be, Z=1.

Accordingly, the mass of the air volume can be calculated as follows:

$$m_k = \frac{p_k \cdot V_k}{R \cdot T_k}. \quad (0.29)$$

During the time dt, the change in mass is $$\Delta m_k = m_k(t_2) - m_k(t_1) = \frac{p_k(t_2) \cdot V_k}{R \cdot T_k(t_2)} - \frac{p_k(t_1) \cdot V_k}{R \cdot T_k(t_1)} \quad (0.30)$$

or if $T_k(t_1) = T_k(t_2)$, this can be simplified to:

$$\Delta m_k = \frac{\Delta p_k \cdot V_k}{R \cdot T_k}. \quad (0.31)$$

This results in the mass flow rate across the seal to be monitored, assuming that $$p_k \ll p_s \text{ and therefore } \dot{m}_2 \ll \dot{m}_1 \quad (0.32)$$

being $$\dot{m}_1 \approx \frac{\Delta m_k}{dt} = \frac{\Delta p_k}{dt} \cdot \frac{V_k}{R \cdot T_k}. \quad (0.33)$$

Compressible Liquids

When using a compressible fluid (water, oil, etc.) with the compression modulus $E_{fluid}$, the leak flow rate can be worked out using the pressure gradient.

The capacity of the control volume can be calculated using the volume $V_k$ and the compression modulus:

$$C_H = \frac{V_k}{E_{fluid}}. \quad (0.34)$$

In the control volume, the change in pressure over time is generally proportional to the sum of the volumetric flow rates flowing in and out:

$$\dot{p}_k = \frac{1}{C_H} \cdot \sum_i Q_i = \frac{1}{C_H} \cdot (Q_1 - Q_2). \quad (0.35)$$

The change in pressure over time based on the time interval dt can now be worked out as a mean, resulting in:

$$\bar{p}_k = \frac{p_k(t2) - p_k(t1)}{dt}. \quad (0.36)$$

Assuming that $$p_k \ll p_s \text{ and therefore } Q_1 \ll Q_2 \quad (0.37)$$

the leak flow rate across the seal to be monitored is $$Q_1 \approx C_H \cdot \frac{\Delta p_k}{dt} \quad (0.38)$$

and the leak mass flow rate is $$\dot{m}_1 \approx \rho_{fluid} \cdot C_H \cdot \frac{\Delta p_k}{dt} = \rho_{fluid} \cdot C_H \cdot \frac{p_k(t2) - p_k(t1)}{dt}. \quad (0.39)$$

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method for determining at the seal of a valve or a valve rod leaks of a working medium being controlled by said valve, comprising:
   determining in a control volume between a first valve-rod seal and a second valve-rod seal, if appropriate as a function of time, the pressure of the working medium controlled by the valve that leaks into said control volume from outside said control volume through one of said first and said second valve-rod seals;
   using the determined pressure to calculate the leak flow rate of said working medium leaking into said control volume;
   using the value obtained for the leak flow rate to draw conclusions as to whether the seal is sealed, and in this way a seal replacement time is determined; and
   measuring, after the control volume is discontinuously opened or emptied and then closed again, the pressure rise of the working medium controlled by the valve that leaks into the control volume.

2. The method according to claim 1 further comprising:
   limiting the pressure of the control volume, and
   emptying, when an upper pressure level is reached, the control volume until a low closing pressure has been established.

3. The method according to claim 2 further comprising:
   recording an upper pressure level and a low closing pressure by pressure switches or by a pressure sensor, and
   determining then a leak flow rate as a function of the closing time, the pressure in the control volume and the state equations of the working medium.

4. The method according to claim 1 further comprising:
   venting or emptying the control volume by way of a switching valve which is actuated by pressure switch means, and determining then a leak flow rate as a function of the closing time, the pressure in the control volume and the state equations of the working medium.

5. The method according to claim 4 further comprising:
driving the switching valve by means of a control programme in such a way that when a test cycle is initiated, the individual steps of the test cycle take place automatically.

6. The method according to claim 5 wherein
the test cycle comprises:
opening the switching valve and venting the control volume,
closing the control volume and starting the control time,
determining a pressure rise by recording the control volume pressure over time, and
evaluating and generating a message or an alarm in the event of predetermined pressure rise values being exceeded.

7. A device for determining leaks at the seal of a valve or a valve rod comprising:
a control volume designed between a first valve-rod seal and a second valve-rod seal of said valve or valve rod;
at least one pressure sensor and/or pressure switch for monitoring the pressure of said control volume;
an evaluation unit or a position regulator connected to said control volume for determining a leak flow rate in said control volume; and
a flow resistance having a filter connected upstream of the flow resistance or a switching valve for venting or emptying said control volume, said switching valve actuatable by means of either a pressure-relief valve or a pressure switch.

8. The device according to claim 7, wherein when the control volume is vented or emptied by said flow resistance, a further pressure sensor is arranged downstream of the filter, and to determine the degree of soiling the differential pressure between the pressure in the control volume and the pressure downstream of the filter is formed or measured, it being possible, if appropriate, to generate a command and/or a signal to change the filter.

9. The device according to claim 7, wherein when the switching valve is actuated by means of said pressure-relief valve the switching valve can be driven by means of an evaluation unit or a position regulator.

10. The device according to claim 7, wherein when the switching valve is actuated by means of said pressure-relief valve the switching valve is a directional control valve.

11. The device according to claim 7, wherein when the switching valve is actuated by means of said pressure-relief valve the switching valve is a 2/2 directional control valve.

12. The device according to claim 7, wherein the control volume can be vented into a closed or closeable volume.

13. The device according to claim 7, characterized in that when suitable leak flow rate limit values are reached, a command and/or a signal to change the valve-rod seal can be generated automatically.

14. The device of claim 7 wherein said valve can be monitored remotely.

15. A method for determining leaks at the seal of a valve or a valve rod, comprising:
determining the pressure, if appropriate as a function of time, in a control volume between a first valve-rod seal and a second valve-rod seal;
using the determined pressure to calculate the leak flow rate, venting the control volume by way of a flow resistance, upstream of which there is a particle filter;
measuring the differential pressure between the control volume pressure and the pressure downstream of the flow resistance; and
determining the degree of soiling of the filter from the measured differential pressure.

* * * * *